United States Patent
Lundin et al.

(10) Patent No.: US 6,956,591 B2
(45) Date of Patent: Oct. 18, 2005

(54) SMOOTH SCROLLING WITH HIGHLIGHTED NAVIGATION AND MARKING OF PAGE CHANGES

(75) Inventors: Jim Lundin, Helsinki (FI); Jere Tuominen, Hyvinkää (FI); Mika Kalenius, Espoo (FI)

(73) Assignee: Nokia Corporation, Espoo (FI)

( * ) Notice: Subject to any disclaimer, the term of this patent is extended or adjusted under 35 U.S.C. 154(b) by 136 days.

(21) Appl. No.: 10/420,546

(22) Filed: Apr. 17, 2003

(65) Prior Publication Data

US 2004/0207647 A1 Oct. 21, 2004

(51) Int. Cl.⁷ .................................................. G09G 5/00
(52) U.S. Cl. ...................................... 345/684; 715/805
(58) Field of Search .............................. 345/672, 684, 345/687; 715/805, 784, 785

(56) References Cited

U.S. PATENT DOCUMENTS

| | | | | |
|---|---|---|---|---|
| 5,999,176 A | * | 12/1999 | Kamper ...................... 345/787 |
| 6,154,205 A | * | 11/2000 | Carroll et al. .............. 345/684 |
| 6,173,316 B1 | * | 1/2001 | De Boor et al. ............ 709/218 |
| 6,188,401 B1 | * | 2/2001 | Peyer .......................... 715/805 |
| 6,222,541 B1 | * | 4/2001 | Bates et al. ................. 715/786 |
| 6,249,689 B1 | * | 6/2001 | Aizawa ....................... 455/566 |
| 6,745,368 B1 | * | 6/2004 | Boucher et al. ......... 715/500.1 |

OTHER PUBLICATIONS

Microsoft® Word 2000 (Copyright © 1983–1999).*

* cited by examiner

*Primary Examiner*—Ryan Yang

(57) ABSTRACT

Textual content arranged in lines and displayed on the screen of electronic device is browsed by a signal processor in response to a down direction selection signal from a down button on a keypad and any links displayed in the lines in a top half of the screen are highlighted link-by-link toward a central area of the screen, wherein after the highlighting progresses to a central area of the screen, in response to further assertions of the down button, scrolling of the textual content commences, line-by-line.

25 Claims, 15 Drawing Sheets

FIG. 4(a)

BEIJING, China (CNN) -- China has moved a step closer to its first manned space flight with the successful launch Monday of its fourth unmanned spacecraft, the official Xinhua News Agency reported.

Xinhua said the Shenzhou (Divine Vessel) IV was carried aloft by a Long March II rocket, which blasted off from its Gobi desert launch pad at 12:40 a.m. (Beijing time) Monday morning (2:40 p.m. Sunday GMT).

It entered a preset orbit and was being tracked by monitoring stations in China and four survey ships in the Pacific, Indian and Atlantic Oceans.

Scientists in charge of China's manned space program said the spacecraft's successful launch laid a "solid foundation" for the goal of sending Chinese

FIG. 4(b)

a "solid foundation" for the goal of sending Chinese astronauts into space, Xinhua reported.

So far, only Russia and the United States have launched manned spacecraft. China has given no target date for a manned attempt, but Monday's Shenzhou launch was the second in 10 months.

A successful manned flight would deliver immense prestige to China's space program.

China launched the Shenzhou I, Shenzhou II and Shenzhou III spacecraft in November 1999, January 2001 and March 2002 respectively from the same site, the Jiuquan satellite launch center in northwest China's Gansu Province.

Spacecraft modified

FIG. 4(c)

Spacecraft modified

Xinhua quoted the spacecraft's leading designer, Qi Faren, as saying data from the three previous launches and return landings had been incorporated in the Shenzhou IV.

The spacecraft had been modified to make it a more comfortable place for astronauts to live and work in, and all the necessary systems for manned flight were installed on the Shenzhou IV craft.

A group of potential Chinese astronauts, chosen from air force fighter pilots, have been training for several years, with their commander Su Shuagning saying they used the Shenzhou IV for their first training inside a capsule.

Su said the astronauts were "absolutely capable" of

FIG. 5(a)

BEIJING, China (CNN) – China has moved a step closer to its first manned space flight with the successful launch Monday of its fourth unmanned spacecraft, the official Xinhua News Agency reported.

Xinhua said the Shenzhou (Divine Vessdel") IV was carried aloft by a Long March II rocket, which blasted off from its Gobi desert launch pad at 12:40 a.m. (Beijing time) Monday morning (2:40 p.m. Sunday GMT).

It entered a preset orbit and was being tracked by monitoring stations in China and four survey ships in the Pacific, Indian and Atlantic Oceans.

Scientists in charge of China's manned space program said the spacecraft's successful launch laid a "solid foundation" for the goal of sending Chinese

FIG. 5(b)

a "solid foundation" for the goal of sending Chinese astronauts into space, Xinhua reported.

So far, only Russia and the United States have launched manned spacecraft. China has given no target date for a manned attempt, but Monday's Shenzhou launch was the second in 10 months.

A successful manned flight would deliver immense prestige to China's space program.

China launched the Shenzhou I, Shenzhou II and Shenzhou III spacecraft in November 1999, January 2001 and March 2002 respectively from the same site, the Jiuquan satellite launch center in northwest China's Gansu Province.

Spacecraft modified

FIG. 5(c)

Spacecraft modified

Xinhua quoted the spacecraft's leading designer, Qi Faren, as saying data from the three previous launches and return landings had been incorporated in the Shenzhou IV.

The spacecraft had been modified to make it a more comfortable place for astronauts to live and work in, and all the necessary systems for manned flight were installed on the Shenzhou IV craft.

A group of potential Chinese astronauts, chosen from air force fighter pilots, have been training for several years, with their commander Su Shuagning saying they used the Shenzhou IV for their first training inside a capsule.

Su said the astronauts were "absolutely capable" of

FIG. 6(a)

BEIJING, China (CNN) – China has moved a step closer to its first manned space flight with the successful launch Monday of its fourth unmanned spacecraft, the official Xinhua News Agency reported.

Xinhua said the Shenzhou (Divine Vessel) IV was carried aloft by a Long March II rocket, which blasted off from its Gobi desert launch pad at 12:40 a.m. (Beijing time) Monday morning (2:40 p.m. Sunday GMT).

It entered a preset orbit and was being tracked by monitoring stations in China and four survey ships in the Pacific, Indian and Atlantic Oceans.

Scientists in charge of China's manned space program said the spacecraft's successful launch laid a "solid foundation" for the goal of sending Chinese

FIG. 6(b)

program ... a "solid foundation" for the goal of sending Chinese astronauts into space, Xinhua reported.

So far, only Russia and the United States have launched manned spacecraft. China has given no target date for a manned attempt, but Monday's Shenzhou launch was the second in 10 months.

A successful manned flight would deliver immense prestige to China's space program.

China launched the Shenzhou I, Shenzhou II and Shenzhou III spacecraft in November 1999, January 2001 and March 2002 respectively from the same site, the Jiuquan satellite launch center in northwest China's Gansu Province.

Spacecraft modified

FIG. 6(c)

Spacecraft modified

Xinhua quoted the spacecraft's leading designer, Qi Faren, as saying data from the three previous launches and return landings had been incorporated in the Shenzhou IV.

The spacecraft had been modified to make it a more comfortable place for astronauts to live and work in, and all the necessary systems for manned flight were installed on the Shenzhou IV craft.

A group of potential Chinese astronauts, chosen from air force fighter pilots, have been training for several years, with their commander Su Shuangning saying they used the Shenzhou IV for their first training inside a capsule.

Su said the astronauts were "absolutely capable" of

FIG. 7(a)

BEIJING, China (CNN) -- China has moved a step closer to its first manned space flight with the successful launch Monday of its fourth unmanned spacecraft, the official Xinhua News Agency reported.

Xinhua said the Shenzhou ("Divine Vessel") IV was carried aloft by a Long March II rocket, which blasted off from its Gobi desert launch pad at 12:40 a.m. (Beijing time) Monday morning (2:40 p.m. Sunday GMT).

It entered a preset orbit and was being tracked by monitoring stations in China and four survey ships in the Pacific, Indian and Atlantic Oceans.

Scientists in charge of China's manned space program said the spacecraft's successful launch laid a "solid foundation" for the goal of sending Chinese

FIG. 7(b)

[program ... the spacecraft's successful launch laid] a "solid foundation" for the goal of sending Chinese astronauts into space, Xinhua reported.

So far, only Russia and the United States have launched manned spacecraft. China has given no target date for a manned attempt, but Monday's Shenzhou launch was the second in 10 months.

A successful manned flight would deliver immense prestige to China's space program.

China launched the Shenzhou I, Shenzhou II and Shenzhou III spacecraft in November 1999, January 2001 and March 2002 respectively from the same site, the Jiuquan satellite launch center in northwest China's Gansu Province.

Spacecraft modified

FIG. 7(c)

Spacecraft modified

Xinhua quoted the spacecraft's leading designer, Qi Faren, as saying data from the three previous launches and return landings had been incorporated in the Shenzhou IV.

The spacecraft had been modified to make it a more comfortable place for astronauts to live and work in, and all the necessary systems for manned flight were installed on the Shenzhou IV craft.

A group of potential Chinese astronauts, chosen from air force fighter pilots, have been training for several years, with their commander Su Shuagning saying they used the Shenzhou IV for their first training inside a capsule.

Su said the astronauts were "absolutely capable" of

DOWN SCROLL

UP SCROLL

SMOOTH SCROLLING WITH HIGHLIGHTED NAVIGATION AND MARKING OF PAGE CHANGES

BACKGROUND OF THE INVENTION

1. Technical Field

The present invention relates to scrolling, navigation and page jumping, for instance in browsers for mobile telephones.

2. Discussion of Related Art

In today's mobile browsers it is hard to navigate and act at the same time. The user can either jump from link to link or scroll but not both at the same time.

Scrolling is done using two navigation keys in some wireless application protocol (WAP) systems. In such WAP browsers the whole Internet page is divided into decks by WML (the WAP equivalent to HTML). With the use of these decks, downloading becomes faster but the screen nonetheless has limitations. HTML does not need decks or pages since the HTML page is able to be shown as one long page. The concept of decks and cards means that each card is a frame displayed on the screen and a collection of interlinked cards as a deck, usually stored in a single WML file. Navigation is done by jumping links in the bottom of the screen Where the page is divided into a screen full of decks the result is that the page is not seen as one big page and scrolling has to be done by jumping. Jumping is a line moving from one text area to another when there is some text that are not links. Scrolling is done by moving line by line and the currently focused link is always the nearest link to the scrolling direction. This causes the user's focus to jump up and down in the screen and causes attraction to be more for surfing. This is because users tend to focus their attention to the thing that is moving, i.e., the link that jumps from link-to-link as the scrolling is taking place. It is natural for the most attractive object to be the high contrast or highlighted area like a link symbol. Such frequently and randomly caused attractions jumping from link-to-link causes frustration to the user who cannot predict when text is to be highlighted or not.

When browsing on a computer, surfing and reading is one smooth action. One can move the mouse on the scroll bar and click the backward or forward button. On a mobile device this is not so easy because of the small screen size and the limited navigation tools. Using the keyboard is more stressful than using a desktop or laptop keyboard. The user will navigate to some locations and use the context by reading the text or watching the pictures. Navigation can then be divided into separate actions. Thus, in some browsers, acting and navigating is divided into two parts so the user can move within a page and stop and act whenever needed. In the PC this is hardly reckonable but is emphasized in mobile devices. Users scroll down, backtrack up again, select the link by clicking a few times left or right and then select the link then scroll down some more and then start to read. This becomes difficult because of the screen size.

In current methods, such as with the Nokia WAP browser provided on the Nokia 9210i, scrolling is not exactly line by line. If the user keeps his eye focused on the top or bottom of the screen, then the user will notice that depending on whether the next line is text or a link and depending on the physical spacing between them, the browser may jump two lines or worse, 1.5 lines, leaving a partially text or link visible to the user. Furthermore, the scrolling is not very consistent when focusing on the top or bottom of the screen (sometimes the browser scrolls line by line from the top, but 1.5 lines from the bottom of that same page).

In pen controlled devices scrolling is done using a pen to tap the scroll bar or draw a page. Acting is done by tapping a link on the screen.

DISCLOSURE OF INVENTION

An object of the present invention is to provide smooth scrolling without any jumping between links where the user will always know where he is on the page.

According to a first aspect of the present invention, a method for browsing textual content arranged in lines and displayed on a screen of an electronic device comprises the steps of highlighting, in response to assertions of a first direction selection signal, any links displayed in the lines in a selected first portion of the screen beginning at a displayed end of the displayed textual content on the screen wherein the highlighting progresses link-by-link from the displayed end toward a central area of the screen, and after the highlighting progresses to the central area, in response to further assertions of the first direction signal, scrolling the textual content line-by-line.

Further according to the first aspect of the invention, the method further comprises the steps of determining, in response to the further assertions of the first direction selection signal, if an end of a current page containing part of the textual content has been reached, and if so, displaying a continuing part of the textual content of a next page and repeating one or more of the steps mentioned in the previous paragraph for the continuing part of the textual content of the next page.

Still further according to the first aspect of the invention, in addition to the step of displaying textual content of the next page, the method further comprises the steps of displaying a selected number of lines from the end of the current page before the textual content of the next page, and indicating a point where the selected number of lines end and the textual content of the next page begins.

Further still according to the first aspect of the invention, the method further comprises the step of before the highlighting progresses to the central area, in response to one or more assertions of a second direction selection signal, highlighting any links displayed in the lines in the selected first portion of the screen beginning at a currently highlighted link and progressing in the second direction link-by-link from said currently highlighted link toward the displayed end of the displayed textual content.

Further still according to the first aspect of the invention, the method further comprises the step of determining after progressing in the second direction link-by-link that the displayed end of the displayed textual content has been reached or that there are no more links to highlight in the second direction, and displaying a continuing part of the textual content of a prior page.

Further still according to the first aspect of the invention, the method further comprises repeating the steps of highlighting and scrolling for the textual content of the prior page.

Further still according to the first aspect of the invention, the method further comprises the step of repeating the step of highlighting except that the progressing of highlighting link-by-link is carried out in a selected second portion of the screen, in response to assertions of the second direction selection signal indicative of a direction opposite the first direction.

Further still according to the first aspect of the invention, the method further comprises the step of repeating the step of scrolling except that the line-by-line scrolling is in response to the second direction selection signal and is carried out in a directional sense opposite from that of the scrolling step.

Further still according to the first aspect of the invention, the method further comprises the step of displaying a cursor situated in the central area of the screen.

According to a second aspect of the invention, a device comprises user interface including a display for browsing textual content arranged in lines and displayed on the display; and a signal processor, responsive to assertions of a first direction selection signal from an input device of the user interface, for highlighting any links displayed in the lines in a selected first portion of the screen beginning at a displayed end of the displayed textual content on the screen wherein the highlighting progresses link-by-link from the displayed end toward a central area of the screen, wherein after the highlighting progresses to the central area the signal processor is responsive to further assertions of the first direction signal, for scrolling the textual content line-by-line.

Further according to the second aspect of the invention, the signal processor, in response to the further assertions of the first direction selection signal, is for determining if an end of a current page containing part of the textual content has been reached, and if so, is for displaying a continuing part of the textual content of a next page.

Further still according to the second aspect of the invention, in addition to the signal processor displaying textual content of the next page, the signal processor is for displaying a selected number of lines from the end of the current page before the textual content of the next page, and is for indicating a point where the selected number of lines end and the textual content of the next page begins.

Still further according to the second aspect of the invention, before the highlighting progresses to the central area, in response to one or more assertions of a second direction selection signal, the signal processor is for highlighting any links displayed in the lines in the selected first portion of the screen beginning at a currently highlighted link and for progressing in the second direction link-by-link from the currently highlighted link toward the displayed end of the displayed textual content.

In further accord with the second aspect of the invention, after progressing in the second direction link-by-link the signal processor is for determining that the displayed end of the displayed textual content has been reached or that there are no more links to highlight in the second direction, and is for displaying a continuing part of the textual content of a prior page.

In still further accord with the second aspect of the invention, the signal processor repeats the highlighting except that the progressing of highlighting link-by-link is carried out in a selected second portion of the screen, in response to assertions of the second direction selection signal indicative of a direction opposite the first direction.

Further according to the second aspect of the invention, the signal processor is for repeating the scrolling except that the line-by-line scrolling is in response to the second direction selection signal and is carried out in an opposite directional sense.

Still further according to the second aspect of the invention, the signal processor displays a cursor in the central area of said screen.

According to a third aspect of the invention, a computer program product for at least temporary storage in a computer readable medium concluding a computer program coded for carrying out the above-mentioned steps of highlighting and scrolling in accord with the first aspect of the invention in the electronic device.

Further according to the third aspect of the invention, a computer program comprises a browser capable of storage on a computer readable medium in an electronic device having a display and navigation tool for navigating textual content arranged in lines and displayed on the display of the electronic device, wherein the browser enables a user to navigate in a down direction by asserting a down direction tool and highlighting any links displayed in the lines in a top half of the screen link-by-link toward a central area of the screen, wherein after the highlighting progresses to the central area of the screen, in response to further assertions of the down direction tool by the user, scrolling of the textual content commences, line-by-line with links highlighted as they pass by the central area.

Further still according to the third aspect of the invention, a cursor is situated in the middle of the page to assist the user in realizing where the central area is.

Further still according to the third aspect of the invention, the cursor is a slightly shaded or colored background, an actual representation of an object, or the like.

This invention squeezes the functionality of a desktop browser into two-click navigation by adding some user-friendly features and intelligence. Focused links are selected smoothly while a user moves in the document. This helps the user to move quickly to the active link when he or she sees an interesting item. The user's attention is not disrupted while browsing. The present invention provides smooth scrolling, no jumping between links and the user always knows where he is on the page.

When entering a new page: (1) the first link in the page is highlighted, (2) subsequent presses either long presses or short presses start scrolling link by link with highlighting until a predefined focus area such as the middle of the page is reached, (3) once the middle of the page is reached or once a focus area in the middle area of the page is reached for instance, there will then be continuous scrolling of the page itself, one line at a time with each press. A long press will cause the page to move continuously in scrolling fashion. In other words, long pressing of the navigation key scrolls the page smoothly at a constant speed. During this scrolling of the page, when a link reaches or passes by the focus area, e.g., the middle of the page, it is highlighted. It is important to emphasize that there may be some cursor line object permanently situated in the middle of the page to help the user realize where the central area is. This could be a slightly shaded or colored background or an actual object like a pointer. If the lengthy pressing of the navigation key stops, then the scrolling stops and a link within the focus area or the closest link above or below the focus area may be highlighted. If there are no links on the screen, then nothing is highlighted. Similarly, when short pressing up or down the page is scrolled one line at a time. When there is more than one link in a row, then a short press highlights each link, link-by-link, e.g., left to right.

At the end of a page, i.e., when scrolling reaches the end of the page, the links are highlighted link-by-link until there are no more links on the page. It is similar for both top and bottom of the page.

A visual indication of the real beginning or end of a textual page is very beneficial from a user-experience point of view. When scrolling page-by-page, portions of the previous line/page are made visible and a visual cue is provided to avoid confusion and annoyance to the user. This indication immediately tells the user from where he left off and to continue reading.

These and other objects, features and advantages of the present invention will become more apparent in light of the following detailed description of a best mode embodiment thereof, as illustrated in the accompanying drawing.

BRIEF DESCRIPTION OF THE DRAWINGS

FIG. 4(a) shows the beginning of a news story as presented on a screen of a device, which is unable to display the entire story at one time.

FIG. 4(b) shows the same screen except after jumping to a middle part of the same story with part of the old story still showing at the top of the screen and a visual mark to show the beginning of the new page, according to the present invention.

FIG. 4(c) shows the final part of the story after jumping to a third section thereof with down at the bottom part of the second half of the story as shown in FIG. 4(b) showing now at the top of the screen of FIG. 4(c) also visually marked according to the present invention with the beginning of the new page.

FIG. 5(a) shows the beginning of a news story as presented on a screen of a device which is unable to display the entire story at one time.

FIG. 5(b) shows the same screen except after jumping to a middle part of the same story with part of the old story still showing at the top of the screen and a visual mark to show the beginning of the new page, according to the present invention.

FIG. 5(c) shows the final part of the story after jumping to a third section thereof with down at the bottom part of the second half of the story as shown in FIG. 5(b) showing now at the top of the screen of FIG. 5(c) also visually marked according to the present invention with the beginning of the new page.

FIG. 6(a) shows the beginning of a news story as presented on a screen of a device which is unable to display the entire story at one time.

FIG. 6(b) shows the same screen except after jumping to a middle part of the same story with part of the old story still showing at the top of the screen and a visual mark to show the beginning of the new page, according to the present invention.

FIG. 6(c) shows the final part of the story after jumping to a third section thereof with down at the bottom part of the second half of the story as shown in FIG. 6(b) showing now at the top of the screen of FIG. 6(c) also visually marked according to the present invention with the beginning of the new page.

FIG. 7(a) shows the beginning of a news story as presented on a screen of a device which is unable to display the entire story at one time.

FIG. 7(b) shows the same screen except after jumping to a middle part of the same story with part of the old story still showing at the top of the screen and a visual mark to show the beginning of the new page, according to the present invention.

FIG. 7(c) shows the final part of the story after jumping to a third section thereof with down at the bottom part of the second half of the story as shown in FIG. 7(b) showing now at the top of the screen of FIG. 7(c) also visually marked according to the present invention with the beginning of the new page.

BEST MODE FOR CARRYING OUT THE INVENTION

Figure 1:
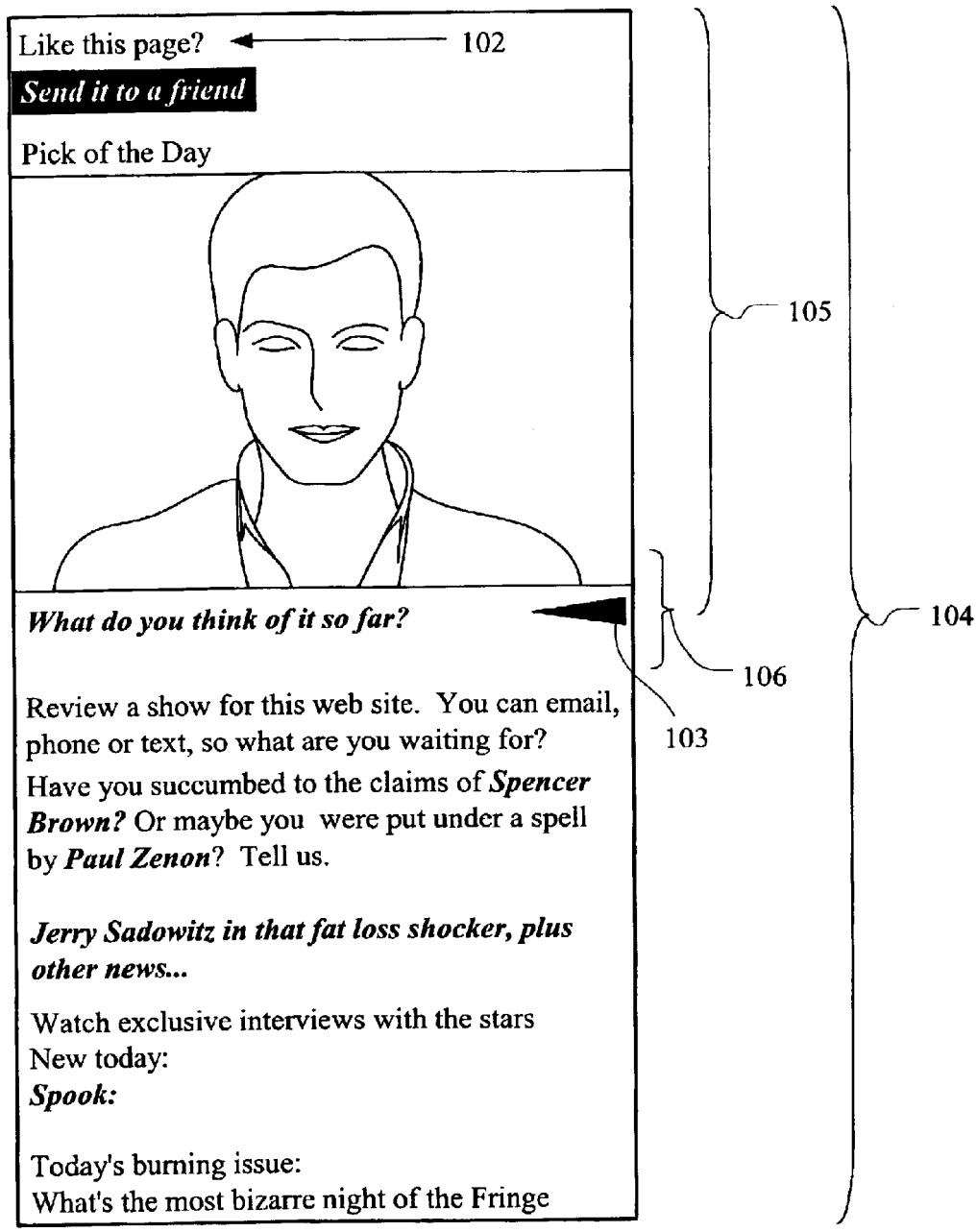
FIG. 1 shows a highlighted link starting from the top of a new page where a long press and one press causes row by row highlighting all the way to the middle of the screen without any scrolling.

FIG. 1 shows the first part of the present methodology where, upon entering a new page, highlighted lines or links start from the top of the page, i.e., the first line or link ("Send it to a friend") in the page is highlighted. If links are being highlighted, the highlight will start with the first link, regardless of whether it is on the first, second, third or subsequent line. If there are two links on the same line, one of them, for instance the left-most link may be highlighted first. After that, the user can assert one press of a navigation key (such as a down button) to cause the next link to be highlighted. If there is another link on the same row as the first link, it will be highlighted next. If there is still another highlighted link to the right of the second link in the same first line, it will be highlighted next, and so on. Or, a "right" button can be used to navigate in a rightwards direction in the same line with the down button used for the downwards direction only. Once all of the links in the first line are highlighted, a subsequent press of the down button will cause the next link to be highlighted, whether it be in the immediately subsequent line or in a line farther down. In other words, subsequent presses of the down button will cause the next topmost link to be highlighted, regardless of how many lines are skipped. This can be made to go very fast by keeping the down button pressed. In other words, a long press will cause a number of such links to be highlighted for a selected very short period of time each. On the other hand, if lines are being highlighted, the highlight will move from line-to-line without skipping lines. The selected time can be any selected time but would preferably be a fraction of a second for each line or link. During this time the page itself is stationary on the screen.

Figure 2:
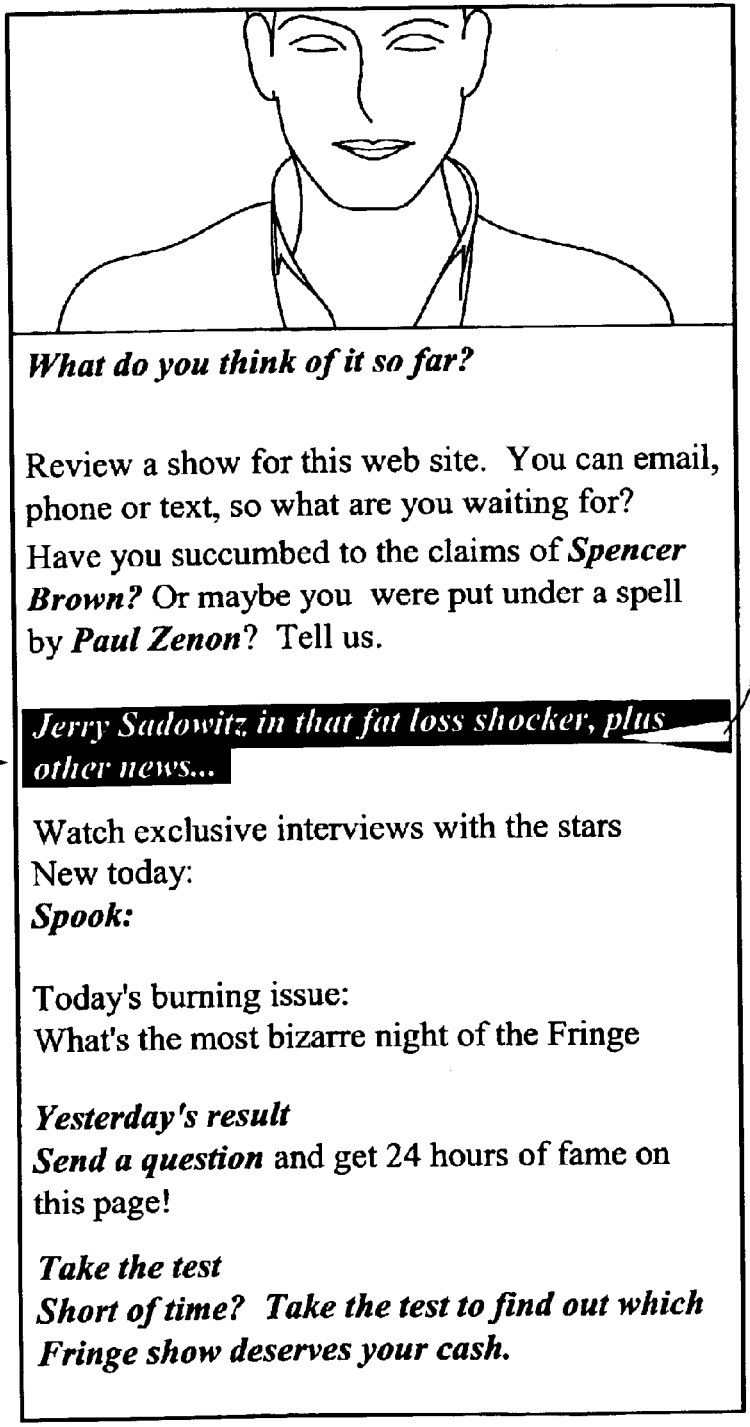
FIG. 2 shows that when the highlighted links reach the middle of the screen, scrolling thereafter begins and the highlighted area stays in the middle.

According to the present invention, this manner of highlighting lines or links starting from the top 102 of the screen or page 102 and jumping from line-to-line or link-to-link in a downward fashion as long as the user continues to repeatedly press the down button or hold it in for a long time, continues until the lines or links being highlighted reach the middle of the screen or in a selected focus area 106, e.g., in the middle of the screen. There may be a cursor line object such as the pointer 103 shown in FIG. 1 situated in a stationary way in the focus area 106 so as to assist the user in having a marker indicative of the focus area. Instead of an arrow 103, the focus area 106 could be slightly shaded or consist of a colored background. This manner of highlighting is confined to the top half 105 of the screen 104. The selected focus area 106 or middle of the screen can be selected to be the exact center or including some number of lines or rows of pixels plus or minus the exact center or surrounding the exact center. In any event, once the middle of the screen is reached, the subsequent pressing of the down button no longer causes the highlight of lines or links to continue jumping downwards. Instead, when the highlighting activity reaches the middle of the screen, scrolling of the page begins and the highlight stays in the same central area, i.e., the currently highlighted area stays in the middle area of the screen. This is shown in FIG. 2 where the highlight has progressed from the top 102 of a page as shown in FIG. 1 to the middle 206 of the page ("Jerry Sadowitz . . . news . . . "). It should therefore be realized that the highlighting of lines or links starting from the top of the page and moving towards the middle 106, 206 as shown beginning at FIG. 1 and ending at FIG. 2 can be done line by line, one row with each press of the key or link by link, depending on the design choice or even by the choice of the user. This can be made an option for the user in selecting browser preferences.

As mentioned above, after reaching the middle of the page, the highlighting effect stays in the middle but the page starts to move up upon continued pressing of the down button either continuously with a long press or one press at a time causing row by row downward scrolling of the page. When a link moves to the middle of the screen, it becomes selected. If there are no links in the middle, then there are no highlights. If there is line-by-line highlighting, the highlight stays in the middle area and highlights each line as it scrolls by.

After page scrolling begins if there is a link present in the middle it is highlighted. If there is no link, then there is no link highlight. Once the middle of the screen has been reached, subsequent up navigation key presses cause the first, second, etc. link from the middle of the screen to be selected. Down-navigation key selection causes page scrolling. The page scrolls one line at a time in the down direction. If there are no links at all on the page, the up and down buttons simply cause scrolling in one direction or the other one line at a time.

Figure 3:
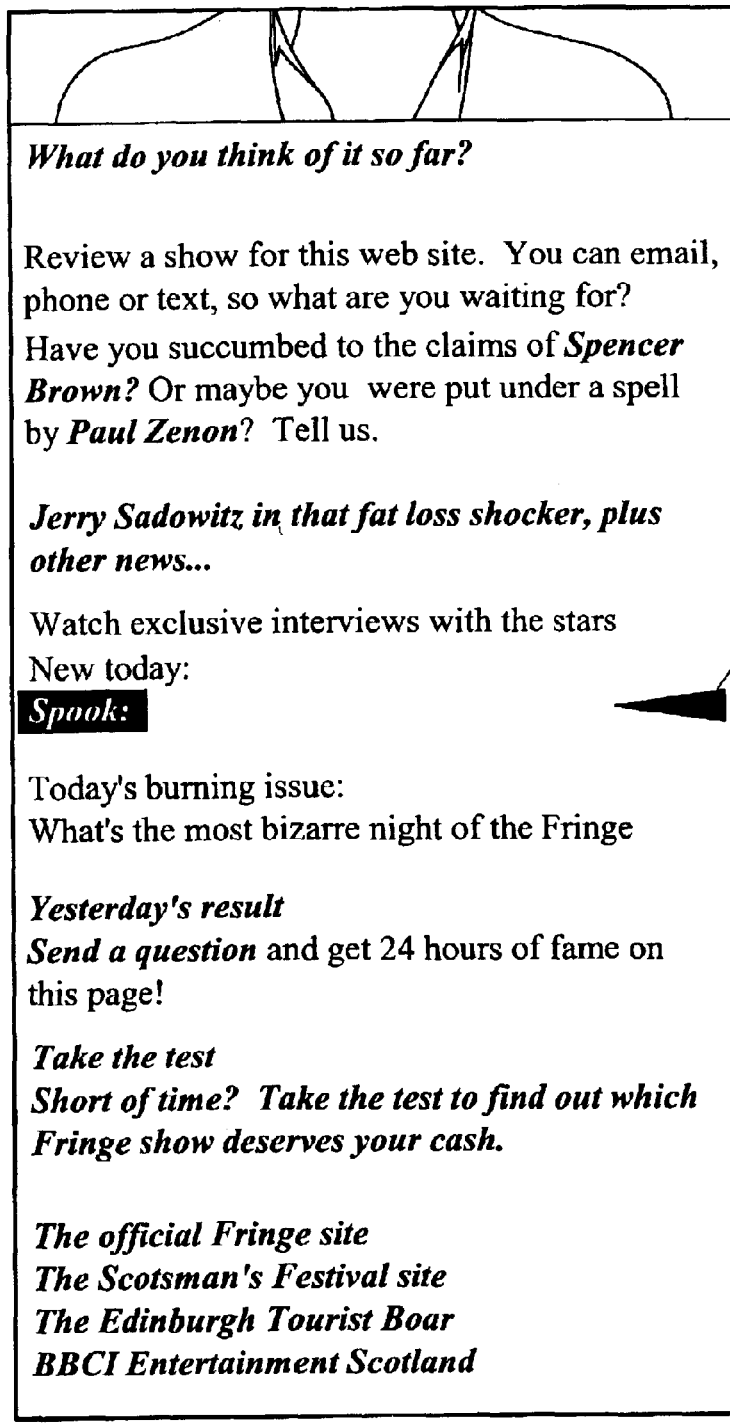
FIG. 3 shows when scrolling further down, another link being selected when it moves to the middle of the screen.

The highlight 210 of FIG. 2 has reached the center of the screen after progressing from the top 102 of FIG. 1 and further presses of the down navigation button has caused the text itself to start scrolling. In other words, before the text and imagery of FIG. 2 has started to scroll, the user has first asserted the down button several times and caused the highlight of FIG. 1 to move from the top of the screen progressively downward to highlight other links such as "What do you think of it so far?", "Spencer Brown?", "Paul Zenon?" and finally "Jerry Sadowitz in that fat loss shocker, plus other news . . . " 210. Once reaching that last mentioned link, further depressions of the down navigation button causes the text itself to start scrolling upwards, i.e., page downwards to expose more text at the bottom part of the screen and to hide text as it progresses upwardly. The highlight, however, stays in the middle area 206 while the user continues to scroll the page downward. As shown in FIG. 3, as the links in the lower part of the page 208, 308 progress upwardly, they become highlighted as they pass through the middle area 306. For instance, the "spook:" link is highlighted in the middle area 306 in FIG. 3 as it passes through that area during the downward scrolling operation. When the "spook:" link is scrolled further upwards, it will be de-highlighted and otherwise not having highlights will scroll by the middle area 306 without being highlighted. The next link to be highlighted as the lines move upwardly will be the "yesterday's result" link, and so on. All of the links shown in the bottom area 308 below the middle area 306 of FIG. 3 of the screen will eventually get highlighted as they move upwardly while the user continues to assert the down navigation button and the page accordingly scrolls downward.

Web (XHTML/HTML) pages on the Internet are mainly designed for large display and the size of the page (in bytes) is usually much larger compared to pages designed precisely for mobile devices. To display (render) large XHTML/HTML-pages to the narrow screen (for instance the Opera browser for the Nokia 7650, etc.) content is rendered into a long vertical column. The total height of this column depends on the size of the page (text, graphics and other objects) but usually the user has to scroll page up and down several times in order to be able to view all content in the page.

Some XHTML/HTML-pages (like news articles, etc.) have a large amount of text and images. When these types of pages are displayed to the narrow screen (for instance, in smart phones), the need for scrolling pages up and down will increase considerably. Smart phone browsers usually scroll content (especially textual) in a page-by-page manner. Very often, however, the page is not scrolled down or up completely but a small amount of the previously visible page is still visible in the top or bottom (depending on the direction of scrolling) part of the new page. This design basically helps the user to locate the place where the previous page was ending and from where to continue the reading/viewing.

Finding the exact place the previous page has ended and the new page starts can be a frustrating and time-consuming operation for the user. In order to avoid this situation, according to the present invention, the exact place where the page has changed should be marked with a visual clue in a way that the user is immediately able to spot the correct place in the page to continue reading. FIG. 4(a) shows the beginning of a long story on a small display. Once the reader finishes the first three paragraphs, there is a need to jump to the next page (or next "card" in the "deck"). As shown in FIG. 4(b), the story continues in a next page with several additional paragraphs but also including the last two lines from the text appearing in FIG. 4(a). According to the invention, the end of the first page or card as shown in FIG. 4(a) is indicated by a visual cue or clue, in this case an underlining effect underlining the last line of text shown in FIG. 4(a). Once the reader gets to the end of the text shown in FIG. 4(b) a jump to the next page or card is effected as shown in FIG. 4(c) where several new paragraphs are displayed, all the way to the end of the story. However, the last line of text appearing in FIG. 4(b) is also shown at the top of FIG. 4(c) with the above-mentioned underlining visual cue or clue to help the user immediately become oriented within the new page or "card" and locate the place where the text on the previous page or card ended. The underlining indicates the place where the previous page or card ended by displaying the last line of the previous page or card at the top of the new page or card shown in FIG. 4(c).

The same story as shown in FIGS. 4(a)–(c) is shown again in FIGS. 5(a)–(c), FIGS. 6(a)–(c) and FIGS. 7(a)–(c). In the sequence of FIG. 5, the transition from the page or card shown in FIG. 5(a) to FIG. 5(b) is indicated by a dotted cue line with small inwardly pointing arrows at the end of the cue line. This is also shown in FIG. 5(c) which shows the same clue or cue. In FIGS. 6(b) and (c), the dotted line is omitted and only the inwardly pointing arrows are shown. In FIGS. 7(b) and (c), the transition from the first to the second page is shown in FIG. 7(b) and by highlighting the top two lines of FIG. 7(b), corresponding to the last two lines of FIG. 7(a). Likewise, the last line of the story as shown in the second section in FIG. 7(b) is shown highlighted at the top of the last or third section of the story as shown in FIG. 7(c).

If there is a link that needs to be highlighted, and it happens to coincide with the technique shown in FIG. 7, a different color or other distinguishing characteristic highlighting can be utilized. Or, some other distinguishing characteristic can be used to distinguish the link highlight from the highlighting used to mark page transitions.

As can be seen from the foregoing, with a visual cue or clue of some sort such as illustrated in a nonlimiting fashion above, the user can immediately spot the "real" beginning of the new page, without first manually searching and locating the correct spot to continue reading. This will ease the reading operation considerably. Since the browser (or other text rendering application) already has knowledge of the point from which the new page starts the implementation of the visual clue or cue is a simple matter.

It is also a teaching of the present invention that the smooth scrolling with highlighted navigation shown in FIGS. 1–3 can be combined with the marking of the page changes in the browser as shown in FIGS. 4–7. This results in a particularly advantageous combination that converge in tackling the problem of maintaining the "focus area" of the user on the page so that he never "lost." The two techniques combined together provide optimal user experience in browsing any content through smooth and consistent scrolling and visual cues as to where the focus area on the page is at all times and the user is never "confused" or "lost."

FIGS. 8 through 17 show a series of steps which may be executed on a computing device to carry out the above described smooth scrolling with highlighted navigation function as well as the page marking function of FIGS. 4–7. Although the description of FIGS. 8 through 17 focus on link-by-link highlighting, it should be realized that the same principles apply to line-by-line highlighting. Such a computing device may include a central processing unit, a data address and control bus, a random access memory (RAM), a read only memory (ROM), a clock, an input/output port, and various other devices known in the art of signal processing devices. Such a device may be included in a mobile phone, a personal digital assistant, a desktop computer, or any other computing device. It has particular advantages in mobile devices, however, because of the small size thereof. In the case of a mobile device which is a mobile telephone, the device will also include a microphone, a speaker, a display, a radio frequency section with amplifiers to amplify signals received from an antenna and to amplify signals prior to being radiated on such an antenna.

Figure 8:
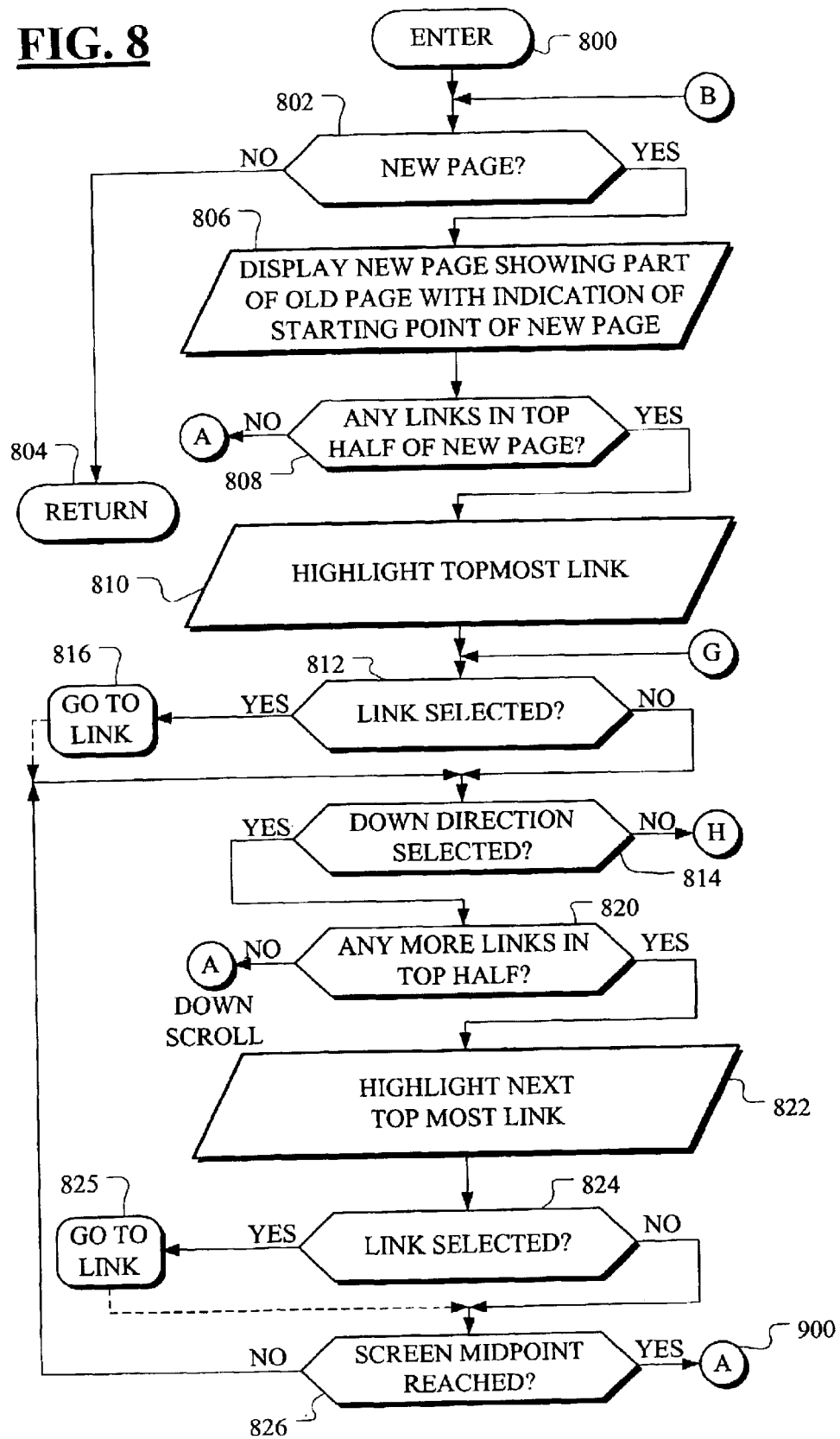
FIG. 8 shows a portion of a series of steps according to the present invention, for execution by a signal processor for entering a new page and highlighting links starting from the top of the new page and causing a row-by-row highlighting of links with the page stationary until the screen midpoint is reached.

Referring first to FIG. 8, after entering in a step 800, a determination is made in a step 802 if a new page is presented on the display or not. If not, a return is made in a step 804. If so, a determination is first made as to whether it is a totally new page such as shown in FIG. 4(a) or a continuation of a previous page such as shown in FIG. 4(b). Once this determination is made, the new page is displayed either as a totally new page or as a continuation page showing part of the old page with an indication of the starting point of the new page such as shown in FIG. 4(b). If the features of the invention as described in FIGS. 4–7 is not implemented in a particular embodiment of the present invention, then the step 806 would merely display the new page without showing any visual cue or other indication of the starting point of a new page.

In any event, once the page is displayed, a determination is then made in a step 808 if there are any links in the top half of the displayed page. If so, a step 810 is executed to highlight the topmost link on the page. If there is more than one topmost link, one of them such as the leftmost can be highlighted first followed by the others one at a time in a left-to-right sequence. It should be appreciated that the present invention can be implemented using a simple two-button approach or a single rocker arm type button with an up and down direction. If two buttons are used, one of them would be up and the other down and they would be most advantageously placed adjacent to each other in a vertically oriented direction with respect to the outside body of the device and the screen so that the directionality of the button placement is aligned with the scrolling direction of the page on the display. Similarly, the longitudinal axis of a rocker-arm should be aligned with the scrolling direction. It should be realized that other navigation devices are available to fulfill the function described.

Once the topmost link is highlighted according to step 810, the step 812 is executed to determine if the link is then selected by the user, e.g., using a link selection button such as an enter button or a mouse click on a cursor. If not, a step 814 is next executed to determine whether the down direction has been selected by the user pressing the down direction button. It should be mentioned that if it is determined in the step 812 that the link has indeed been selected, a transition is made via a step 816 out of the program shown in FIG. 8 to a website or link where other operations may be carried out not related to the present invention. If, after completing such operations, the user desires to return to the original page, a return can be made in some undefined fashion as indicated by a dashed line 818 returning to the program of FIG. 8 where a determination is then made in the step 814 whether the down direction has been selected or not. If so, a determination is made in a step 820 if there are any more links remaining in the top half of the display screen. If so, the next topmost link is highlighted as indicated in a step 822. A step 824 is then executed to determine if the currently highlighted link is selected or not. If not, a determination is made in a step 826 if the screen midpoint has been reached or not. If not, the step 814 is executed again to find out if the down direction is selected or not. The steps 820, 822, 824, 826 will then be executed again as described previously assuming the same condition, where the user is gradually scrolling down in the top half of the screen by pushing the down direction button either with a long holddown or one click at a time. The alternatives shown by transitions H and A after negative determinations in steps 814 and 820, respectively, will be described later.

Figure 9:
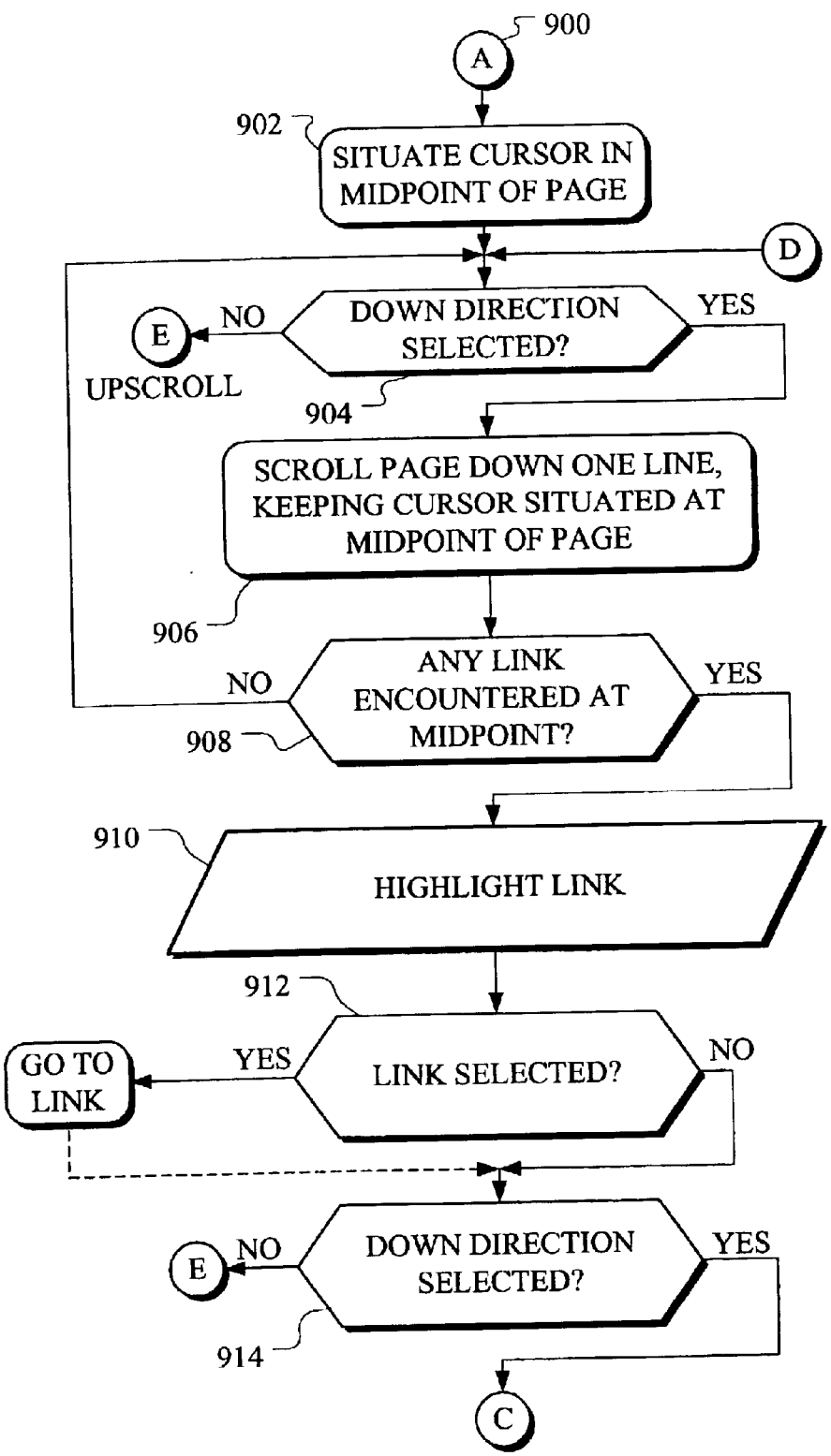
FIG. 9 shows situating the cursor at a focus area, e.g., in the midpoint of the page and from that point on scrolling down the page itself so that subsequent highlighted links are always highlighted in the middle of the page until the end of the page is reached. In other words, the page starts moving after the cursor reaches the midpoint and the links move by the midpoint where they are highlighted.
Figure 10:
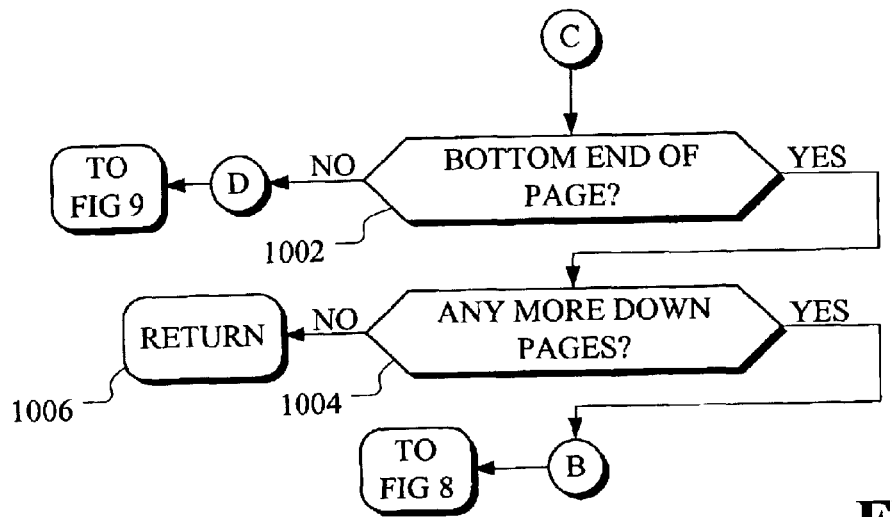
FIG. 10 illustrates a situation where after beginning to scroll downwards, the user decides to scroll up.

Turning now to FIG. 9, after the determination is made in the step 826 of FIG. 8 that the screen midpoint has been reached, a step 902 is executed to situate the cursor (if there is one) in the midpoint of the page. There need not actually be a visible cursor but the effect will be the same in that the focus area will remain in the middle of the page from this point onward, assuming the user continues to scroll downwardly. If a cursor such as the cursor 103 of FIG. 1 is used, it need not suddenly appear at the step 902 of FIG. 9 but could be visible in the stationary way all the time so as to assist the viewer in locating the central focus area 106 in the stable way. Referring back to FIG. 9, to determine if the down direction is selected, a step 904 is executed to find out if the down direction has been selected or not. If so, the page is scrolled down by one line, keeping the cursor situated at the midpoint of the page. This really means that the page text moves up by one line, even though the user perceives the page as scrolling downwardly. As the lines move through the midpoint in an upward direction one line at a time, a determination is made for each line as shown in a step 908, whether any link has been encountered in a line at the midpoint as the line moves by. If not, the step 904 is executed again to determine if the down direction has been selected or not. If, on the other hand, a link has been encountered at the midpoint during the operation of step 906, the step 908 will make this determination and transition to a step 910 for highlighting the encountered link. A determination is then made in the step 912 as to whether or not the link has been selected or not by the user selecting the link that has been highlighted by taking some action such as pushing a selection button or clicking on the link with a mouse or otherwise activatable cursor, or by some other method. If the link has not been selected, a step 914 is then executed to determine if the down direction has been selected or not. If so, a transition C is made to a series of steps shown in FIG. 10. Referring to FIG. 10, a step 1002 is executed first to determine if the bottom end of the page has been reached or not. If so, a step 1004 is executed to determine if there are anymore pages to display. If not, a return is made in a step 1006. If there are more pages, a transition is made as indicated in a transition step that leads back to the beginning of FIG. 8. If the determination had been made in the step 1002 that the down direction selection determined in step 914 did not result in the bottom end of the page being reached, a transition is made as shown by a transition step D back to FIG. 9 where the step 904 is then executed again to determine if the down direction has been selected again.

Referring back to FIG. 8, suppose that in the initial determination of whether there are any links to highlight in the top half of the new page as determined in the step 808, it is determined that there are no such links in the top half of the page. In that case, as shown in FIG. 8, a transition is made to FIG. 9 where the cursor is situated immediately in the midpoint of the page at least effectively as shown in the step 902. As suggested, this need not be an actual situation of a cursor at the midpoint of the page but merely the functionality of having the down button acting as a line by line page scrolling function will take effect at this point immediately. And the steps shown in FIG. 9 will be executed directly without having to go through the highlighting of links which do not exist in the top half of the page. Therefore, the remaining steps of FIG. 8 will not be executed for such a page.

Figure 12:
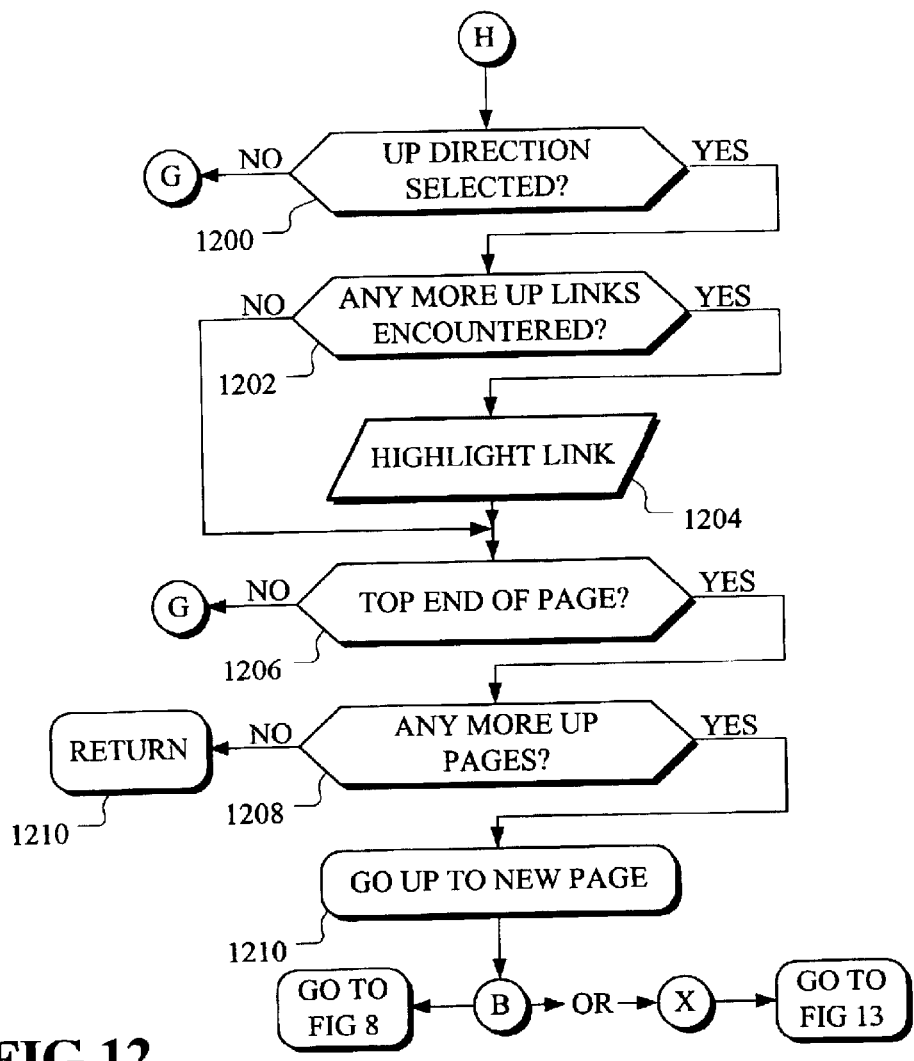
FIG. 12 shows a situation where the user has begun to highlight the top most links in the top half of a page by moving the cursor link-by-link down the page and who then decides to change directions and keep going up until a new page is reached, after which the routine of FIG. 8 is executed again.
Figure 17:
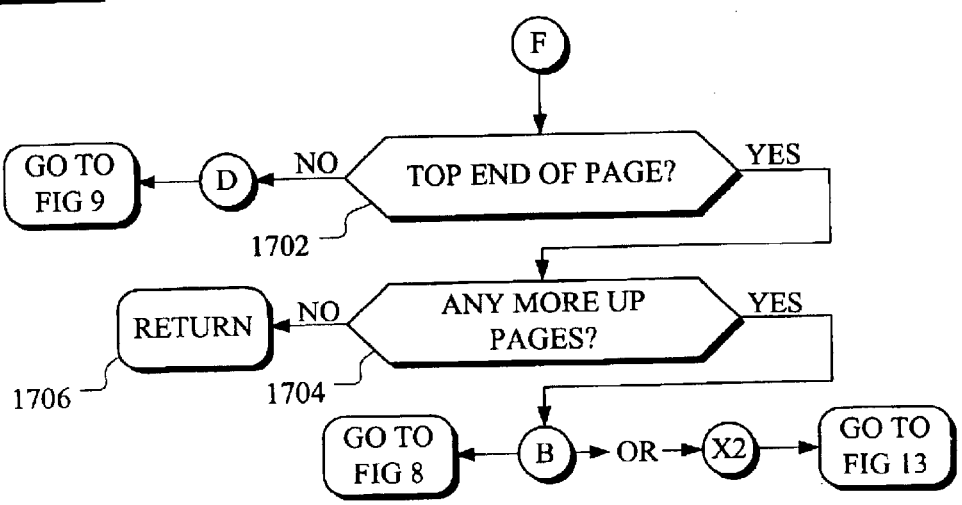
FIG. 17 shows a test of whether a top-end of a page has been reached and if so if there are anymore up pages.

Also, still referring to FIG. 8, there must also be a mechanism to keep checking whether or not the down direction has been selected or not as shown in step 814 but likewise if such a determination results in a finding that the down button has not been selected, a transition is made as indicated by a transition H to the series of steps shown in FIG. 12 to find out if the up direction is selected.

Referring now to FIG. 12, after transitioning from the step 814 of FIG. 8, a step 1200 is first executed to determine if the up direction has been selected by the user depressing the up direction button. If not, a return is immediately made via a transition G to FIG. 8 where step 812 is reexecuted with the result that a departure is made from executing the steps of FIG. 12 to reexecuting the steps of FIG. 8. On the other hand, if a determination is made in the step 1200 that the user has indeed selected the up direction, a step 1202 is executed to determine if there are any more up links encountered by virtue of moving up to any such link existing in the upper direction in the upper half of the page. If so, the next link in the upward direction is highlighted as indicated in the step 1204. If not, the step 1204 is skipped and a determination is made in the step 1206 if the top end of the page has been reached by virtue of the user using up all of the available "up" space. If so, a determination is made in the step 1208 if there are anymore up pages left to display. If not, a return is made in a step 1210. But if there are more up pages to display, a transition is made to the next up page for purposes of display by either transitioning back to a transition B of FIG. 8 or an alternative embodiment transition X shown in FIG. 13. These are alternative ways to display an up page and which will both be described. It should be mentioned that if the step 1206 determines that the top end of the page has not been reached by virtue of the fact that there is more space available to scroll in the up direction, a transition G is made back to FIG. 8 where the step 812 is executed again, and so on.

If the alternative represented by a transition B is chosen as a design choice or user preference, the scrolling up to a new page causes the step 802 to be reexecuted followed by the other steps shown in FIG. 8 meaning that the user will be presented with the same sort of scenario for smooth scrolling a new "up" page with highlighted navigation, as has been described above for the previous "down" page. This means that the first link in the top of the new "up" page will be become highlighted and subsequent scrolling by long or short presses by the user will cause links to be highlighted link-by-link in the downward direction until such highlight scrolling reaches the focus area, e.g., the middle of the page. After that, continued long presses or short presses in the downward direction will cause continuous scrolling of the page itself rather than link by link highlighting wherein the links will be highlighted as they pass by the center of the page. This is one approach to execute the present invention after jumping from a page to a page in the upward direction.

But there is another approach as described in connection with FIGS. 13–18. In this approach, once the user chooses to jump upwards to a new page, in other words to backtrack, the link scrolling takes place in a reverse direction, i.e., in the bottom of the page moving upwards towards the center of the page link-by-link until the cursor reaches the center of the page where it stops. At that point, further upward scrolling causes the page itself to scroll upwards. By upwards is meant that the lines of the page itself are moving downwards so that the reader can get access to higher lines on the page. So this is the mirror image of what was done when scrolling downward for getting access to lower level lines.

Figure 13:
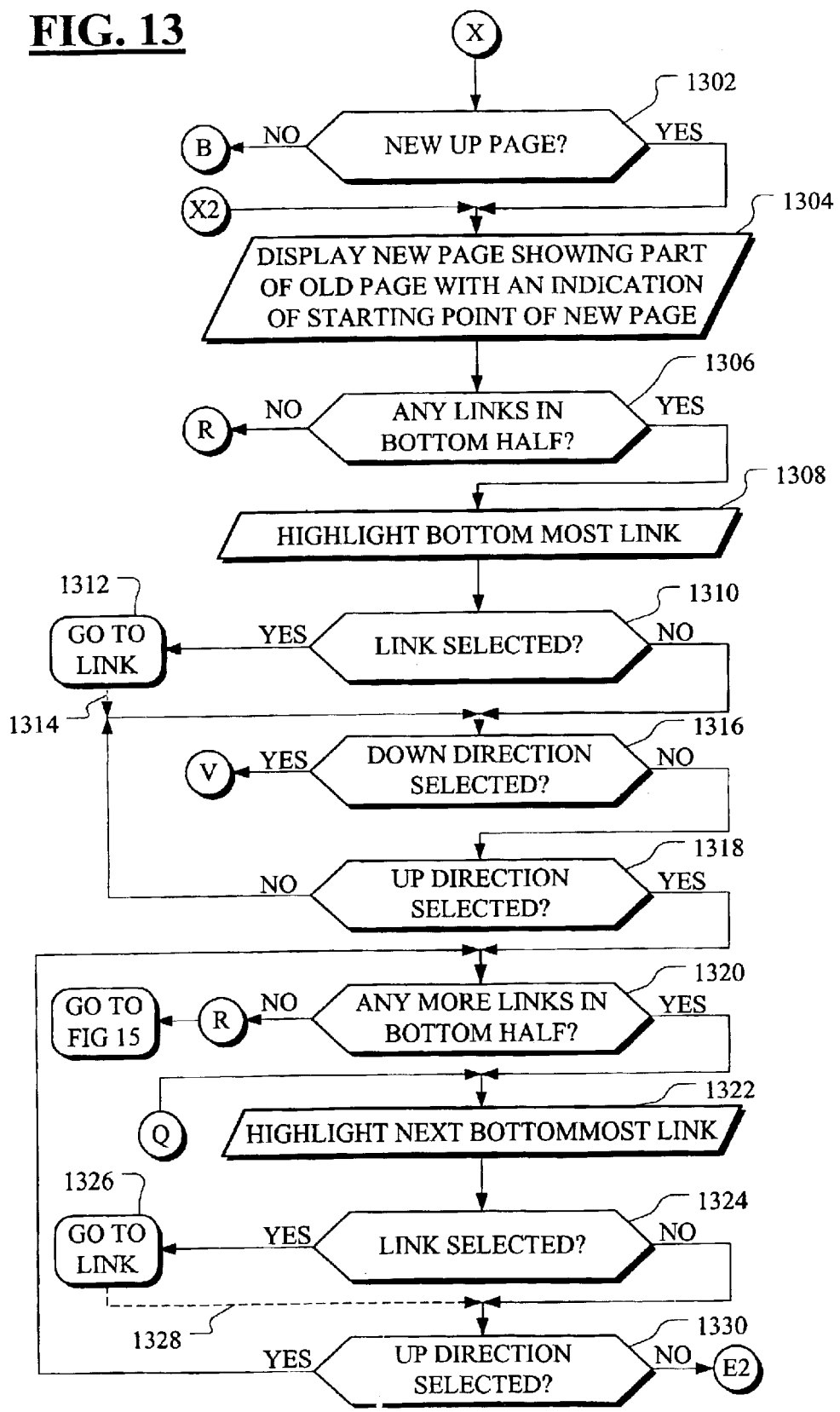
FIG. 13 shows an alternative to executing FIG. 8 again as shown at the transition at the bottom of FIG. 12, to instead reverse the highlighting methodology shown in FIG. 8 so that links are highlighted from the bottom of the page upwards until the middle is reached, after which scrolling upwards begins.

Referring now to FIG. 13, which is transitioned from a transition X shown at the bottom of FIG. 12 (alternative to transition B) a determination is made in a step 1302, as to whether a new up page exists or not. If not, a transition is immediately made as indicated by a transition B back to FIG. 8 followed by execution of step 802. On the other hand, if there is a new page as determined in the step 1302, a step 1304 is executed to display the new page showing part of the old page with an indication of the starting point of the new page. As opposed to the highlighting shown in FIG. 7(b) or 7(c), the highlighting would be shown in the bottom of the page because the smooth scrolling movement is upwards. This would help the reader to reread where he left off on the bottom of the previous page and quickly decide what to do next. After that, a step 1306 is executed to determine if there are any links in the bottom half of the page. If not, a transition R is made to FIG. 15 where the cursor is situated immediately in the midpoint of the page, but this will be described later. Assuming there are some links in the bottom half of the new up page, as determined in the step 1306, a step 1308 is next executed to highlight the bottom most link on that new up page. A determination is then made in a step 1310 as to whether the link has been selected by the user or not. If so, a transition is made to the link as indicated in a step 1312. Once the user is finished navigating the link selected, a return could be made to the sequence of steps shown in FIG. 13 as indicated by a transition line 1314. In any event, a step 1316 is next executed to determine if the down direction has been selected by the user depressing the down button. If so, a transition V is made to step 1404 of FIG. 14 and the page is scrolled down one line followed by the rest of the steps of FIG. 14, as determined by the user and as described more fully below. If the down direction is not selected as determined in the step 1316, a step 1318 is executed to determine if the up direction has been selected again by the user depressing the up button. If not, the step 1316 is executed again. If up is selected as determined by step 1318, a step 1320 is executed to determine if there are any more links in the bottom half of the new up page. If not, a transition is made in transition R to the steps of FIG. 15 to be described later. If there are more links in the bottom half as determined by the step 1320, a step 1322 is executed to highlight the next bottommost link, i.e., the next higher link on the new up page. A determination is then made in a step 1324 as to whether or not the user has selected this newly highlighted link. If so, a transition is made to the link URL as indicated in a step 1326. Once the user comes back to the new up page as indicated by a transition 1328, or after a determination that the highlighted link has not been selected in the step 1324, a step 1330 is executed to determine if the up direction has been selected by the user depressing the up button. If so, the step 1320 is reexecuted. If not, a transition E2 is made to execute the steps of FIG. 14.

Figure 14:
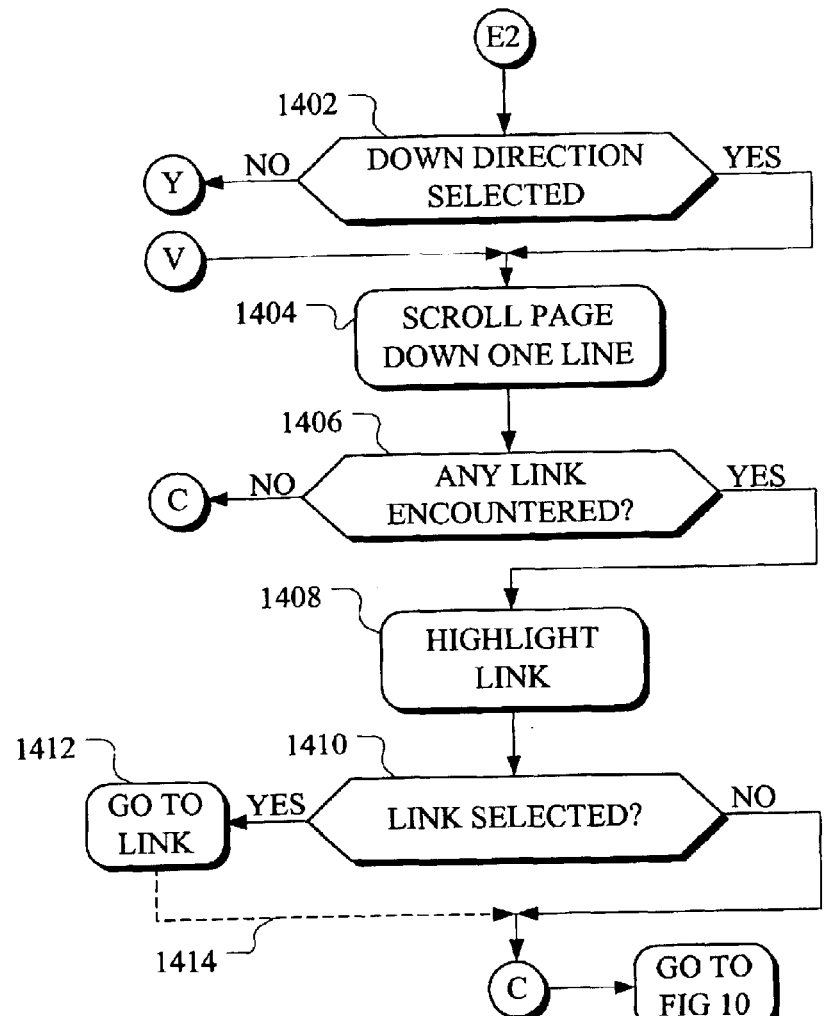
FIG. 14 is a continuation of FIG. 13.

Referring now to FIG. 14, a determination is first made in a step 1402 as to whether or not the down direction has been selected by the user depressing the down button. If so, this means that before the upwardly progressing selection of links has progressed to the middle of the screen, the user has changed direction and is now deciding to highlight links in the down direction while still navigating in the lower half of the page. This means that the methodology can revert back to the methodology shown in FIG. 9 similar to steps 906 et seq. of FIG. 9 where instead of highlighting links to the bottom half of the screen, scrolling of the page itself is done instead. Therefore, as shown in a step 1404, the page is scrolled down one line in response to the down direction selection detected in step 1402. It should be realized, on the other hand, that link selection could be done instead to this downward direction without scrolling the page. But scrolling the page seems more consistent with what was done before and more in keeping with a consistent user interface. So, after scrolling the page down one line in the step 1404, a step 1406 is executed to determine if any link has been encountered when scrolling down one line in step 1404. If not, a transition C is made to the steps of FIG. 10 to determine if the bottom of the page has been reached or not and if so, whether there are any more down pages. On the other hand, if a link is encountered, as determined in the step 1406, a step 1408 is executed to highlight the encountered link followed by a step 1410 to determine if the link has been selected by the user. If so, a transition can be made to the link as indicated in a step 1412 and once the user has finished at the link gone to in the step 1412, a return can be made as signified by a dashed line 1414 to the transition C. This transition is also made directly if the link is not selected as determined in the step 1410.

Figure 15:
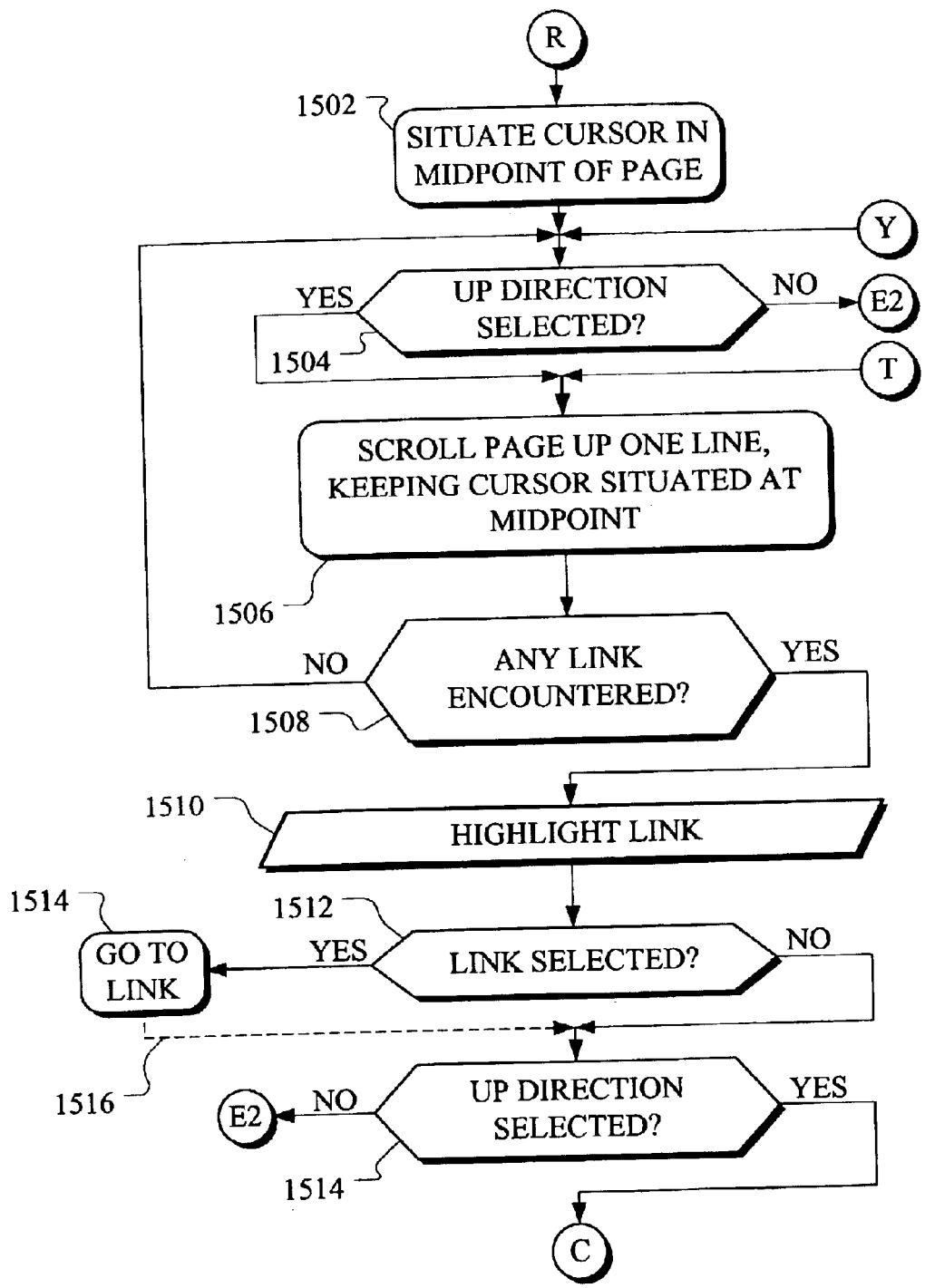
FIG. 15 shows the situation where after moving up a page in the alternative of FIG. 13, the cursor is situated in the midpoint of the page.

Referring back to FIG. 13, if it is determined in the step 1320 that there are no more links in the bottom half while navigating upwardly, a transition R is made to the step shown in FIG. 15.

Referring now to FIG. 15, a step 1502 is first executed to situate the cursor in the midpoint or focus area of the new "up" page. As mentioned previously, this cursor situation may by invisible to the user in the sense of not actually showing a cursor. But, functionally speaking, there will be the effect of any link passing by the midpoint getting highlighted as it stops or passes by this midpoint with page scrolling. So, after situating the cursor in the midpoint of the page in the step 1502, a step 1504 is then executed to determine if the up direction is selected by the user pressing the up button or not. If not, a transition E2 is made back to FIG. 14 for execution of step 1402 to determine if the down direction button is selected. If it is determined in the step 1504 that the up direction is indeed selected, a step 1506 is executed to scroll the page up one line, keeping the cursor situated at the midpoint. In other words, all the lines of the page are moved down one line and a new line is exposed at the top of the page. A determination is then made in a step 1508 as to whether or not any link has been encountered in scrolling up one line. If not, the step 1504 is executed again. If a link is encountered as determined in the step 1508, the link is highlighted as indicated in a step 1510 followed by a determination in a step 1512 as to whether or not the user has decided to select this newly highlighted link. If so, a transition is made to go to the selected link as indicated in a step 1514. After going to the link and doing whatever operations are selected there, the user may return as indicated in the transition line 1516. If the link is not selected as determined in the step 1512, a step 1514 is executed directly to determine if the up direction has been selected or not. If not, a transition E2 is made back to FIG. 14 for execution of step 1402 to determine if the down direction has been selected. If it is determined on the other hand that the up direction has indeed been selected as determined by the step 1514, a transition S is made to the step shown in FIG. 16 to determine if the top end of the page has been reached or not as indicated in a decision step 1602. If not, a transition T is made back to FIG. 15 and step 1506 is executed to scroll the page up one line. If the top end of the page is reached as determined by the step 1602, a determination is made in the step 1604 as to whether there are any more up pages available. If not, a return is made in a step 1606. If so, a transition X2 is made back to FIG. 13 where the step 1304 is executed to display the new page.

Figure 11:
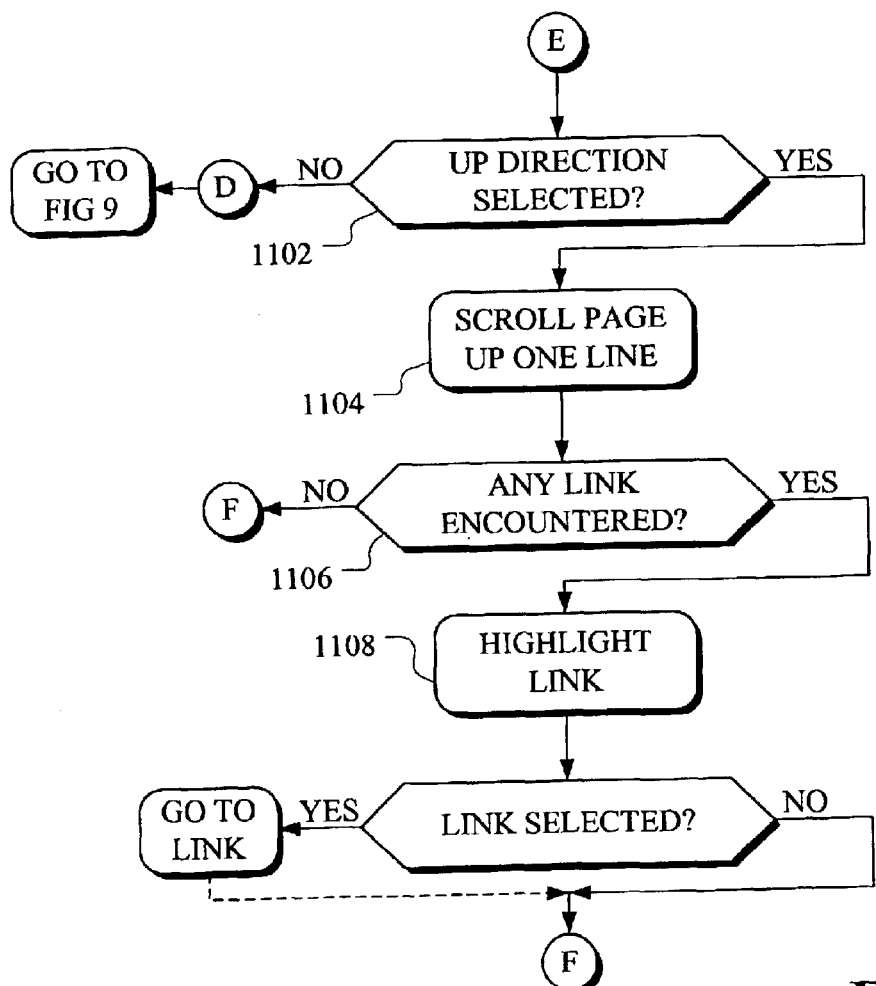
FIG. 11 shows a subroutine to determine whether the bottom end of a page has been reached and, if so, if there are any more down pages.
Figure 16:
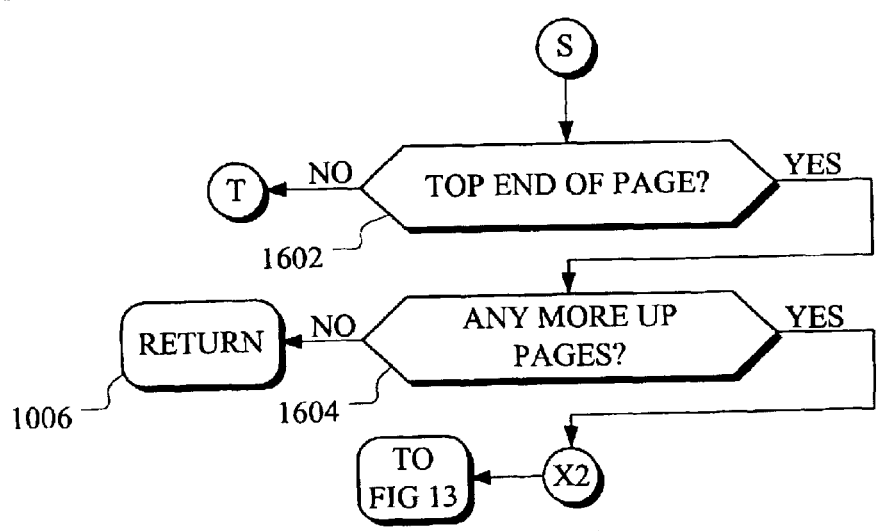
FIG. 16 is a continuation of FIG. 15 where a determination is made after moving up to the top of a page whether the end of the page has been reached and if so, determining if any more pages exist.

Referring back to FIG. 9, in a manner similar to that just described for FIG. 16, if it is determined in the step 904, that the down direction is not selected, a transition E is made to FIG. 11 where a determination is made in a step 1102 as to whether the up direction is selected or not. If not, a transition D is made to FIG. 9 step 904. If so, the page is scrolled up one line as indicated in a step 1104. If a link is encountered in the focus area during this up scroll as determined in a step 1106, the link is highlighted as indicated in a step 1108. If not, a transition F is made to FIG. 17 where a step 1702 is executed to find out if the top end of the page has been reached or not. If not, a transition is made to step 904 of FIG. 9. If the top end of the page has been reached as determined in the step 1702, a step 1704 is executed to find out if any more up pages exist. If not, a return is made as indicated in a step 1706. If so, a transition B is made back to step 802 of FIG. 8. In the alternative, a transition X2 is made back to step 1304 of FIG. 13, depending on design or user choice.

Figure 18:
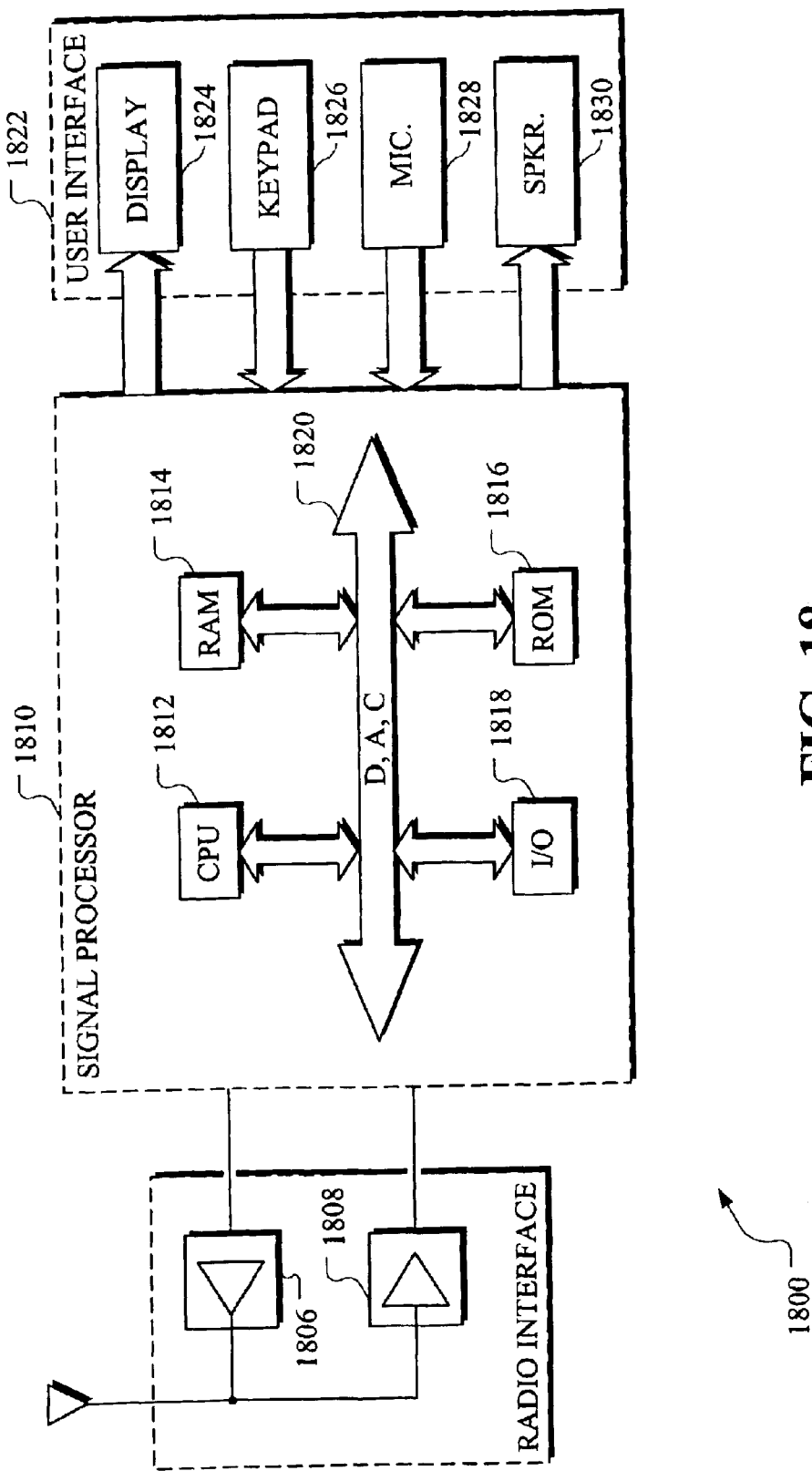
FIG. 18 shows a device for carrying out the invention.

FIG. 18 shows a device 1800 which may be a portable device such as a mobile telephone, personal digital assistant, or combination thereof. It should be realized that it could also be a desktop computer which has similar components except not having a radio interface 1802. The radio interface 1802 of the device of FIG. 18 includes an antenna 1804 and an output stage 1806 for the uplink and an input stage 1808 for the downlink which together may be combined within the radio interface 1802. The antenna may serve both the uplink and downlink stages and there may be a duplexer provided to effect this combination. The radio interface is not part of the invention so will not be described in further detail except to point out that it is connected to a signal processor 1810 which includes a central processing unit 1812, a random access memory (RAM) 1814, a read only memory (ROM) 1816 and an input/output (I/O) port 1818, all connected to a data, address, and control (D, A, C) bus 1820. The read only memory 1816 stores a computer program which is coded in accordance with the flow charts shown in FIGS. 8–16. The CPU 1812 accesses the coded program stored in the ROM 1816 and executes the steps using the RAM 1814 to store intermediate results and to store information used to interface with a user interface (UI) 1822. The UI includes a display 1824, a keypad or keyboard 1826, a microphone 1828, and a speaker 1830. Other user interface components besides those shown may be included or the user interface may contain less than that shown in FIG. 18 or otherwise be different. The device of FIG. 18 interfaces as a whole with a network such as the Internet for instance by way of a radio access network connected thereto. This is all well known in the art and need not be discussed here. In any event, it should be realized that the signal processor 1810 and particularly the ROM 1816 comprises a computer readable medium that stores a computer program having a methodology expressed as a series of steps as shown in FIGS. 8–18 for execution by the CPU 1712 for interfacing with the outside environment of the signal processor. Consequently, the device 1800 of FIG. 18 constitutes a device according to the present invention for browsing textual content arranged in lines and displayed on a screen 1824 of the device 1800. The ROM 1816 by virtue of the stored computer program and/or data structure thereof constitutes means for highlighting, in response to assertions of an up or down selection signal, any links displayed in the lines in a top portion of the screen beginning at the end of the textual content on the screen wherein the highlighting progresses link-by-link from the displayed end toward a central area of the screen. After the highlighting progresses to the central area, in response to further assertions of the down direction signal, the textual content is scrolled downward line-by-line rather than link-by-link. Moreover, the computer program itself may be viewed as a data structure organized as shown in FIGS. 8–18 for storage in the ROM 1816 of FIG. 18 so that the data structure can be accessed by the CPU 1816 in a manner known to those of skill in the art of programming.

In addition to the highlighting aspect mentioned above, the computer program stored in the ROM 1816 of FIG. 18 also is able to determine, in response to further assertions of the down direction signal, if an end of the current page containing the part of the textual content displayed on the screen has been reached, and if so, displaying a continuing part of the textual content of a next page and repeating one or more of the bottom lines of the preceding page on the next page. This assists the user in immediately determining the place to begin reading again, while still being able to see where the user left off at the bottom of the previous page, and explained more fully in connection with FIGS. 4–7. It should also be evident that the other features described above in the methodology disclosed in FIGS. 8–18 are also encoded according to a computer program language in the ROM 1816 of FIG. 18 and are executed by the signal processor of 1810 using the CPU 1812, RAM 1814 and I/O 1818 along with the user interface 1822 and perhaps the radio interface 1802, if applicable.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method for browsing textual content arranged in lines and displayed on a screen of an electronic device, comprising the steps of:

highlighting (810, 822), in response to assertions of a first direction selection signal (814), any links displayed in said lines in a selected first portion (105) of said textual content beginning at a displayed end (102) of said displayed textual content on said screen (104) wherein said highlighting progresses link-by-link from said displayed end toward a central area (106) of said textual content, and after said highlighting progresses (A) to said central area, in response to further assertions of said first direction signal, scrolling (906) said textual content line-by-line.

2. The method of claim 1, further comprising the steps of:

determining (1002), in response to said further assertions of said first direction selection signal, if an end of a current page containing part of said textual content has been reached, and if so, displaying (1004, B) a continuing part of said textual content of a next page and repeating one or more of said steps of claim 1 for said continuing part of said textual content of said next page.

3. The method of claim 2, wherein in addition to said step of displaying textual content of said next page, said method further comprises the steps of:
   displaying a selected number of lines from said end of said current page before said textual content of said next page, and
   indicating a point where said selected number of lines end and said textual content of said next page begins.

4. The method of claim 1, further comprising the step of:
   before said highlighting progresses to said central area, in response to one or more assertions of a second direction selection signal, highlighting any links displayed in said lines in said selected first portion of said textual content beginning at a currently highlighted link and progressing in said second direction link-by-link from said currently highlighted link toward said displayed end of said displayed textual content.

5. The method of claim 4, further comprising the step of
   determining after progressing in said second direction link-by-link that said displayed end of said displayed textual content has been reached or that there are no more links to highlight in said second direction, and
   displaying (1210; B, 802; X, 1302) a continuing part of said textual content of a prior page.

6. The method of claim 5, further comprising repeating (B) one or more steps of claim 1 for the textual content of said prior page.

7. The method of claim 5, further comprising repeating (X) said step of highlighting except that said progressing of highlighting link-by-link is carried out in a selected second portion (208, 308) of said textual content, in response to assertions of the second direction selection signal indicative of a direction opposite said first direction.

8. The method of claim 7, further comprising repeating (R) said step of scrolling except that said line-by-line scrolling is in response to said second direction selection signal and is carried out in a directional sense opposite from that of the scrolling step of claim 1.

9. The method of claim 1, further comprising the step of displaying a cursor (103) situated in said central area of said textual content.

10. Device, comprising:
    user interface including a display for browsing textual content arranged in lines and displayed on said display; and
    signal processor, responsive to assertions of a first direction selection signal from an input device of said user interface, for highlighting any links displayed in said lines in a selected first portion (105) of said textual content beginning at a displayed end (102) of said displayed textual content on said screen (104) wherein said highlighting progresses link-by-link from said displayed end toward a central area (106) of said textual content, wherein after said highlighting progresses (A) to said central area said signal processor is responsive to further assertions of said first direction signal, for scrolling (906) said textual content line-by-line.

11. The device of claim 10, wherein said signal processor, in response to said further assertions of said first direction selection signal, is for determining if an end of a current page containing part of said textual content has been reached, and if so, is for displaying (1004, B) a continuing part of said textual content of a next page.

12. The device of claim 11, wherein in addition to said signal processor displaying textual content of said next page, said signal processor is for displaying a selected number of lines from said end of said current page before said textual content of said next page, and is for indicating a point where said selected number of lines end and said textual content of said next page begins.

13. The device of claim 10, wherein
    before said highlighting progresses to said central area, in response to one or more assertions of a second direction selection signal, said signal processor is for highlighting any links displayed in said lines in said selected first portion of said textual content beginning at a currently highlighted link and for progressing in said second direction link-by-link from said currently highlighted link toward said displayed end of said displayed textual content.

14. The device of claim 13, wherein after progressing in said second direction link-by-link said signal processor is for determining that said displayed end of said displayed textual content has been reached or that there are no more links to highlight in said second direction, and is for displaying (1210; B, 802; X, 1302) a continuing part of said textual content of a prior page.

15. The device of claim 14, wherein said signal processor repeats said highlighting except that said progressing of highlighting link-by-link is carried out in a selected second portion (208, 308) of said textual content, in response to assertions of the second direction selection signal indicative of a direction opposite said first direction.

16. The device of claim 15, wherein said signal processor is for repeating (R) said scrolling except that said line-by-line scrolling is in response to said second direction selection signal and is carried out in an opposite directional sense.

17. The device of claim 10, wherein said signal processor displays a cursor in the central area of said textual content.

18. A computer program product for at least temporary storage in a computer readable medium including a computer program coded for carrying out the steps of claim 1 in said electronic device.

19. A computer program comprising a browser capable of storage on a computer readable medium in an electronic device having a display and navigation tool for navigating textual content arranged in lines and displayed on said display of said electronic device, wherein said browser enables a user to navigate in a down direction by asserting a down direction tool and highlighting any links displayed in the lines in a top half of the textual content link-by-link toward a central area of the textual content, wherein after the highlighting progresses to the central area of the textual content, in response to further assertions of the down direction tool by the user, scrolling of the textual content commences, line-by-line with links highlighted as they pass by the central area.

20. The computer program of claim 19, wherein a cursor is situated in the middle of the page to assist the user in realizing where the central area is.

21. The computer program of claim 20, wherein the cursor is a shaded or colored background or an actual representation of an object.

22. The method of claim 1, further comprising the step of highlighting said links as they scroll by the central area.

23. The device of claim 10, wherein said links are highlighted as they scroll by the central area.

24. The computer program of claim 20, wherein said links are highlighted as they scroll by the central area.

25. The device of claim 10, further comprising a radio interface connected to said signal processor for communicating over a radio link to obtain said textual content.

* * * * *